(12) United States Patent
Rhee et al.

(10) Patent No.: US 9,863,814 B2
(45) Date of Patent: Jan. 9, 2018

(54) CORRECTION OF ROTATIONAL INACCURACY IN LATERAL SHEARING INTERFEROMETRY

(71) Applicant: KOREA RESEARCH INSTITUTE OF STANDARDS AND SCIENCE, Daejeon (KR)

(72) Inventors: Hyug-Gyo Rhee, Daejeon (KR); Young Sik Ghim, Sejong (KR); Ho Soon Yang, Daejeon (KR); Yun Woo Lee, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 208 days.

(21) Appl. No.: 14/318,003

(22) Filed: Jun. 27, 2014

(65) Prior Publication Data
US 2015/0146213 A1    May 28, 2015

(30) Foreign Application Priority Data
Nov. 26, 2013 (KR) ........................ 10-2013-0144618

(51) Int. Cl.
G01J 9/02 (2006.01)
G01J 9/00 (2006.01)

(52) U.S. Cl.
CPC ....... *G01J 9/0215* (2013.01); *G01J 2009/002* (2013.01)

(58) Field of Classification Search
CPC .................. G01J 2009/002; G01J 9/0215
See application file for complete search history.

(56) References Cited

U.S. PATENT DOCUMENTS 8,223,442 B2    7/2012  Yamagata et al.
2013/0202215 A1*  8/2013  Yonetani ............. G01B 11/255
                                                          382/203

FOREIGN PATENT DOCUMENTS

| JP | H05-34120 A | 2/1993 |
| JP | 2013-186017 A | 9/2013 |
| KR | 20030080803 A | 10/2003 |
| KR | 10-0631821 B1 | 10/2006 |

(Continued)

OTHER PUBLICATIONS

Hyug-Gyo Rhee, Correction of rotational inaccuracy in lateral shearing interferometry for freeform measurement, Oct. 21, 2013, 10 pgs., vol. 21, No. 21, Optics Express.

*Primary Examiner* — Hwa Lee
(74) *Attorney, Agent, or Firm* — Harness, Dickey & Pierce, P.L.C.

(57) ABSTRACT

Provided is an operating method of a measuring apparatus measuring a wavefront of a target. The operating method includes measuring a measurement wavefront on the basis of the wavefront of the target, measuring reference slope information and first to third slope information respectively corresponding to a reference direction and first to third directions on the basis of the measurement wavefront, obtaining first to third rotation angles on the basis of the measured reference slope information and first to third slope information, and outputting a wavefront of which an error is corrected, which is generated by rotation errors on the basis of the obtained first to third rotation angles, wherein the first to third rotation angles are differences in angle between the reference direction and the first to third directions.

9 Claims, 9 Drawing Sheets

(56) References Cited

FOREIGN PATENT DOCUMENTS

KR     20080071096 A     8/2008
KR     2012-0134962 A     12/2012

\* cited by examiner

Fig. 1

CONVENTIONAL ART

Fig. 2

CONVENTIONAL ART

Fig. 3

CONVENTIONAL ART

CORRECTION OF ROTATIONAL INACCURACY IN LATERAL SHEARING INTERFEROMETRY

CROSS-REFERENCE TO RELATED APPLICATIONS

A claim for priority under 35 U.S.C. §119 is made to Korean Patent Application No. 10-2013-0144618, filed on Nov. 26, 2013, the entire content of which is hereby incorporated by reference.

BACKGROUND

The present invention disclosed herein relates to a wavefront sensor, and more particularly, to an operating method of a first derivative measuring apparatus.

Various interferometers including a Michelson interferometer and a Mach-Zehnder interferometer compare a reference wavefront and a measurement wavefront and correct an error included in the measurement wavefront. On the contrary, a lateral shearing interferometer detects a slope value of a measurement wavefront without a separate reference wavefront to measure an error. In detail, the lateral shearing interferometer separates a measurement wavefront of a target into two identical wavefronts, and allows one of the two wavefronts to be sheared in a lateral direction. The lateral shearing interferometer mixes the sheared wavefront and an original wavefront to cause interference, and measures the interference pattern. The interference pattern measured at this time includes slope information about the measurement wavefront. The lateral shearing interferometer obtains the slope information of the measurement wavefront, integrates the obtained information over the entire domain, and obtains an error of the measurement wavefront. First derivative measuring devices may operate by above-described scheme. The first derivative measuring devices may include various devices such as a deflectometry, a lateral shearing interferometer, and a Shack-Hartmann sensor.

These first derivative measuring devices obtain slope information of a measurement wavefront by rotating targets or devices through 90° in a direction perpendicular to a reference direction. In this procedure, when the rotation angle is not precisely 90°, there may be an error between the measured wavefront and an actual wavefront.

SUMMARY

The present invention provides a wavefront detecting method capable of correcting an error (for example, an error occurring due to a rotation error) of a first derivative measuring apparatus measuring a wavefront of a target.

Embodiments of the present invention provide operating methods of a measuring apparatus measuring a wavefront of a target. The operating methods include: measuring a measurement wavefront on the basis of the wavefront of the target; measuring reference slope information and first to third slope information respectively corresponding to a reference direction and first to third directions on the basis of the measurement wavefront; obtaining first to third rotation angles on the basis of the measured reference slope information and first to third slope information; and outputting a wavefront of which an error is corrected, which is generated by rotation errors on the basis of the obtained first to third rotation angles, wherein the first to third rotation angles are differences in angle between the reference direction and the first to third directions.

In some embodiments, the measuring of the reference slope information and first to third pieces of slope information may include, performing shearing of the measurement wavefront along the reference direction by a predetermined amount and measuring the reference slope information on the basis of the wavefront sheared along the reference direction; performing shearing of the measurement wavefront along the first direction by a predetermined amount and measuring the reference slope information on the basis of the wavefront sheared along the first direction; performing shearing of the measurement wavefront along the second direction by a predetermined amount and measuring the second slope information on the basis of the wavefront sheared along the second direction; and performing of shearing of the measurement wavefront along the third direction by a predetermined amount and measuring the third slope information on the basis of the wavefront sheared along the third direction.

In other embodiments, the obtaining of the first to third rotation angles may include obtaining the first to third rotation angles on the basis of a least square optimization.

In still other embodiments, the obtaining of the first to third rotation angles on the basis of the least square optimization may include performing a repetitive operation on the basis of a repetitive scheme allowing variations of the first to third rotation angles to be smaller than a threshold value.

In even other embodiments, the first to third rotation angles respectively may include rotation errors, and the rotation errors indicate differences that the first to third rotation angles respectively deviate from 90°, 180°, and 270°.

In yet other embodiments, as the rotation errors are smaller, a difference between the wavefront of the target and the error-corrected wavefront may be reduced.

In further embodiments, the measuring apparatus may be any one of a lateral shearing interferometer, a Shack-Hartmann sensor, and a deflectometry.

BRIEF DESCRIPTION OF THE DRAWINGS

Example embodiments of the inventive concepts will become more apparent in view of the attached drawings and accompanying detailed description. The example embodiments depicted therein are provided by way of example, not by way of limitation, wherein like reference numerals refer to the same or similar elements. The drawings are not necessarily to scale, emphasis instead being placed upon illustrating aspects of example embodiments of the inventive concepts.

DETAILED DESCRIPTION OF PREFERRED EMBODIMENTS

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, it will be described about an exemplary embodiment of the present invention in conjunction with the accompanying drawings.

Figure 1:
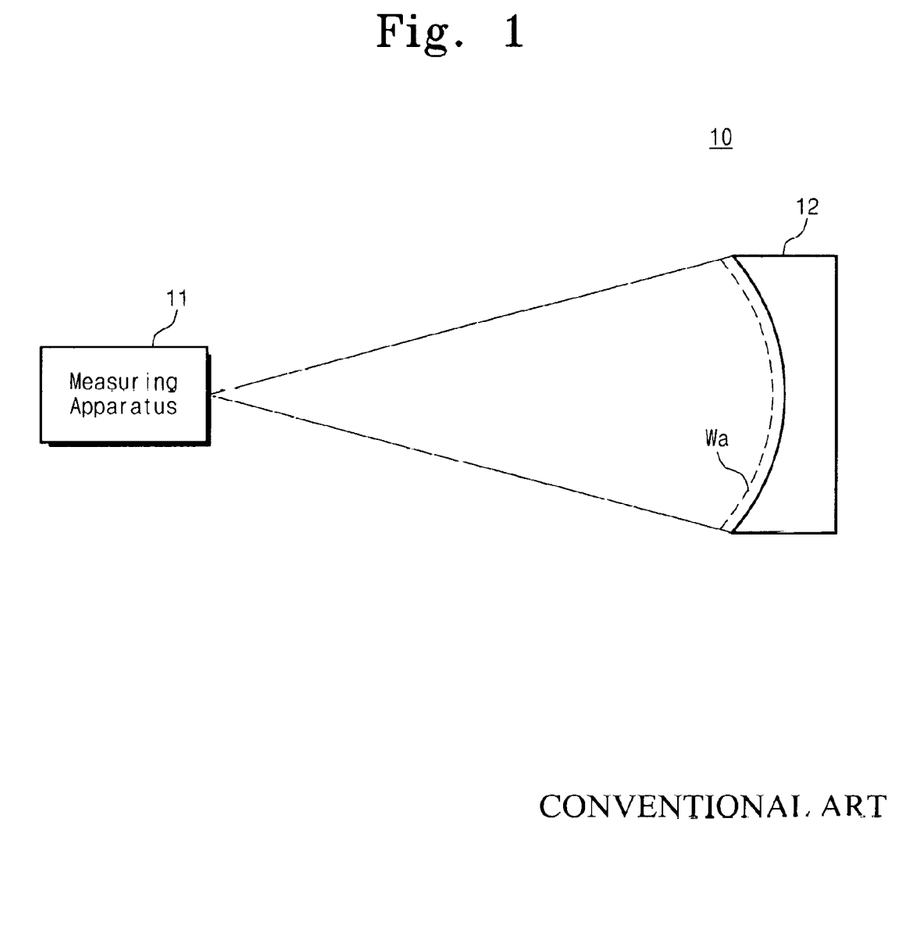
FIGS. 1 to 3 illustrate exemplary measuring apparatuses using an interferometer.
Figure 2:
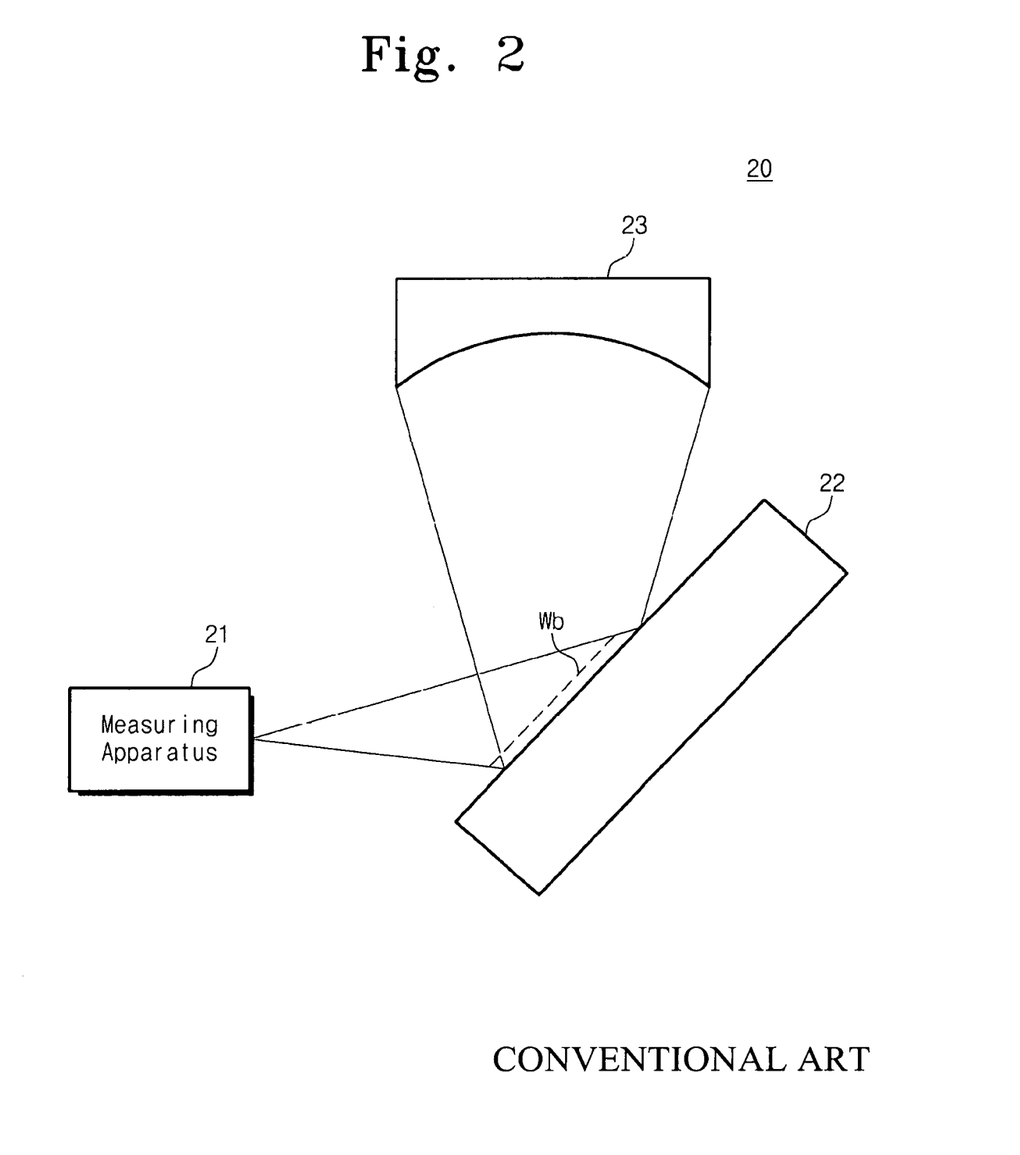
Figure 3:
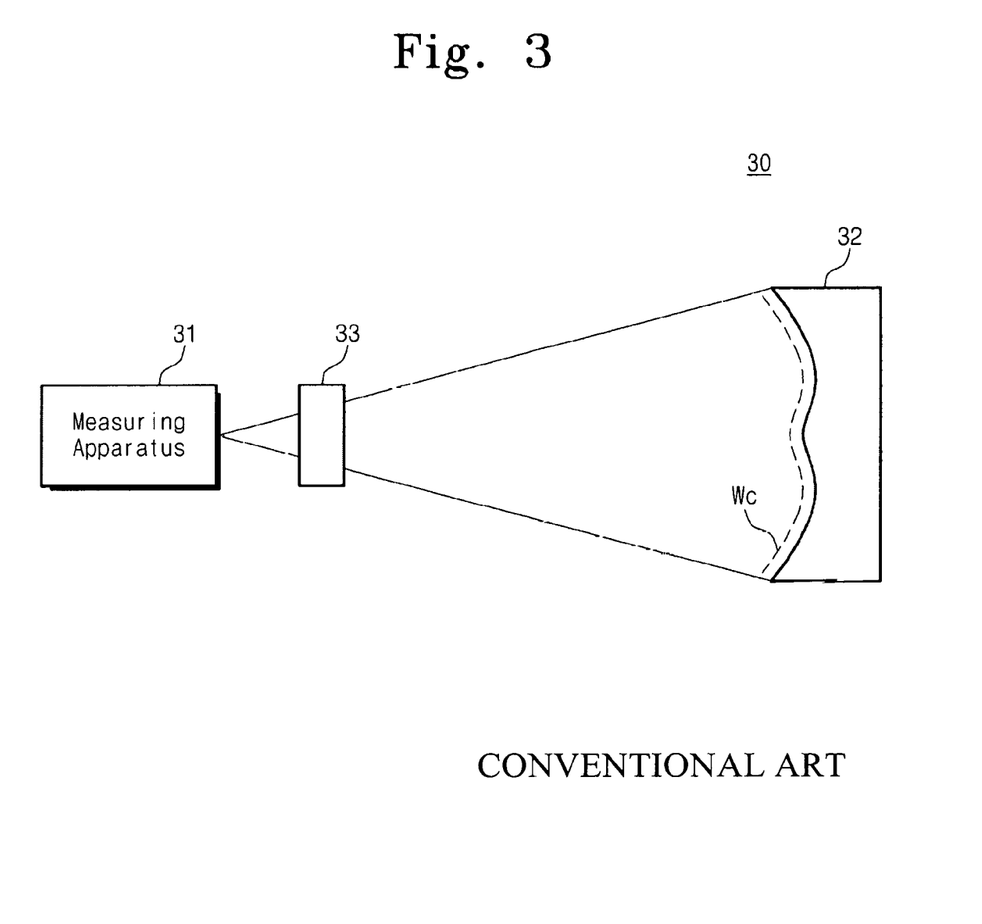

FIGS. 1 to 3 illustrate exemplary measuring systems using an interferometer. Referring to FIGS. 1 to 3, the measuring system may operate based on an interferometer. The interferometer compares a light that passes through and a light that does not pass through a measurement target. The interferometer may detect a length and distance of a wavelength, or an optical distance, etc.

First, the measuring system 10 of FIG. 1 measures a spherical surface. In exemplary embodiments, the spherical surface may be substantially a spherical surface. The measuring system 10 may include a measuring apparatus 11 and a target 12. The measuring apparatus 11 may measure a wavefront Wa of the target 12. For example, the wavefront indicates points (namely, an equiphase surface) having an equal phase at the same time in a traveling wave. The target 12 may include a substantial spherical surface. At this time, a wavefront measured by the measuring apparatus 11 may be a substantial spherical surface. Since the measuring apparatus 11 measures a wavefront Wa, which is a substantial spherical surface of the target 12, a spherical wave reflected by the target causes the same interference as a reference spherical wave over the entire spherical surface of the target 12. For example, the reference spherical wave may be generated inside the measuring apparatus 11. The reference spherical wave may be the same as that output from the measuring apparatus 11.

The measuring system 20 in FIG. 2 measures a substantial plane. The measuring system 20 includes a measuring apparatus 21, a target 22, and a reference spherical surface 23. The measuring apparatus 21 may measure a wavefront Wb of the target 22. The target 22 may include a substantial plane. At this time, the wavefront Wb measured by the measuring apparatus 21 may be a substantial plane. For example, the target 22 may be inclined by a predetermined degree such that the spherical wave output from the measuring apparatus 21 is reflected towards the reference spherical surface 23. The spherical wave output from the measuring apparatus 21 may be reflected by the target 22 and the reference spherical surface 23. At this time, the reflected spherical wave generates the same interference as that caused by the reference spherical wave over the entire reference spherical surface 23.

The measuring system in FIG. 3 includes a measuring apparatus 31, a target 32, and a transformation lens 33. The measuring apparatus 31 may detect a wavefront Wb of the target 32. The target 32 may include an aspherical surface. The aspherical surface includes a surface that is gradually flattened from a center portion towards a peripheral portion or a symmetrical surface to the center portion. The measuring apparatus 31 may detect the aspherical surface of the target 32 by using the transformation lens 33. The transformation lens 33 may transform the spherical wave of the measuring apparatus 32 into an aspherical wave that matches with the aspherical surface of the target 32. For example, the transformation lens 33 may be a computer generated hologram (CGH). That is, the aspherical wave transformed through the transformation lens 33 generates the same interference as that caused by the reference spherical wave over the entire aspherical surface of the target 32.

The measuring apparatuses described in relation to FIGS. 1 to 3 may detect a wavefront of a spherical surface, a plane, or an aspherical surface. However, since the measuring apparatuses detect the measurement wavefront in a scheme comparing the reference spherical surface and the measurement wavefront, they do not detect a wavefront of a target including a free-form surface. In order to detect the free-form surface, a first derivative measuring apparatus that does not use the reference wavefront is employed. The first derivative measuring apparatus includes a lateral shearing interferometer, a deflectometry, or a Shack-Hartmann sensor.

Hereinafter, the first derivative measuring apparatus according to an embodiment of the present invention is assumed to be the lateral shearing interferometer. However, the scope of the present invention is not limited hereto, and the technical spirit of the present invention may be applied to a measuring apparatus or a measuring system detecting a wavefront of a target by using a first derivative equation.

Figure 4:
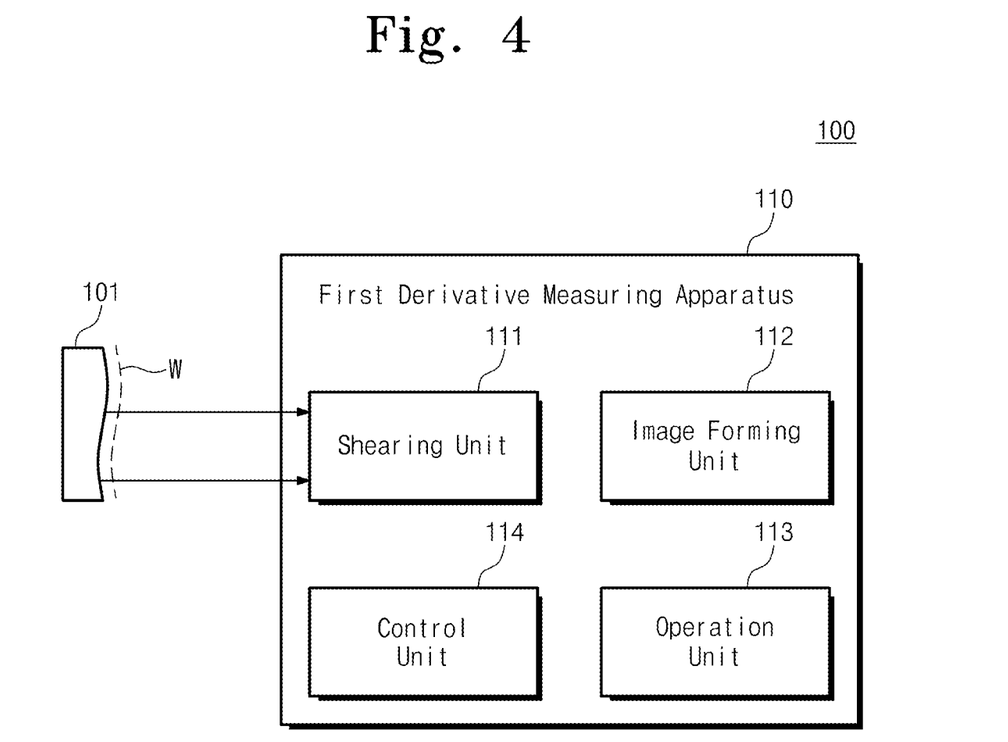
FIG. 4 illustrate a first derivative measuring system according to an embodiment of the present invention.

FIG. 4 illustrates a first derivative measuring system according to an embodiment of this invention. Referring to FIG. 4, the first derivative measuring system 100 includes a measuring apparatus 110 and a target 101. The measuring apparatus 110 may measure a wavefront of the target 101. For example, the target 101 may include a free-form surface. That is, the measuring apparatus 110 may measure a wavefront W, which is the free-form surface of the target 101.

The measuring apparatus 110 includes a shearing unit 111, an image forming unit 112, a calculating unit 113, and a controlling unit 114. The shearing unit 111 may adjust a reflected light so that the reflected light reflected by the target 101 (or a light passing through the target 101) is allowed to be sheared by a predetermined value in a specific direction. For example, the shearing unit 111 may be input the reflected light which is sheared by a predetermined value along the first direction. The operation of the shearing unit 111 will be described in detail with reference to drawings below.

The image forming unit 112 may detect the reflected light and the light sheared by the shearing unit 111. For example, the image forming unit 120 may include an image sensor such as a charge coupled device (CCD) image sensor, or a complementary metal oxide semiconductor (CMOS) image sensor, and an optical device such as an optical diode.

The calculating unit 113 may detect an actual wavefront of the target 101 based on lights image-formed in the image forming unit 112. For example, the calculating unit 113 may detect slope information of the measurement wavefront on the basis of the reflected light and the sheared light, and detect the actual wavefront of the target 101 by integrating the detected slope information. In exemplary embodiments, the calculating unit 113 may detect or obtain a rotation angle of the sheared direction. The rotation angle detecting operation will be described in detail in relation to drawings and equations below. The controlling unit 114 may control an entire operation of the measuring apparatus 110.

Figure 5:
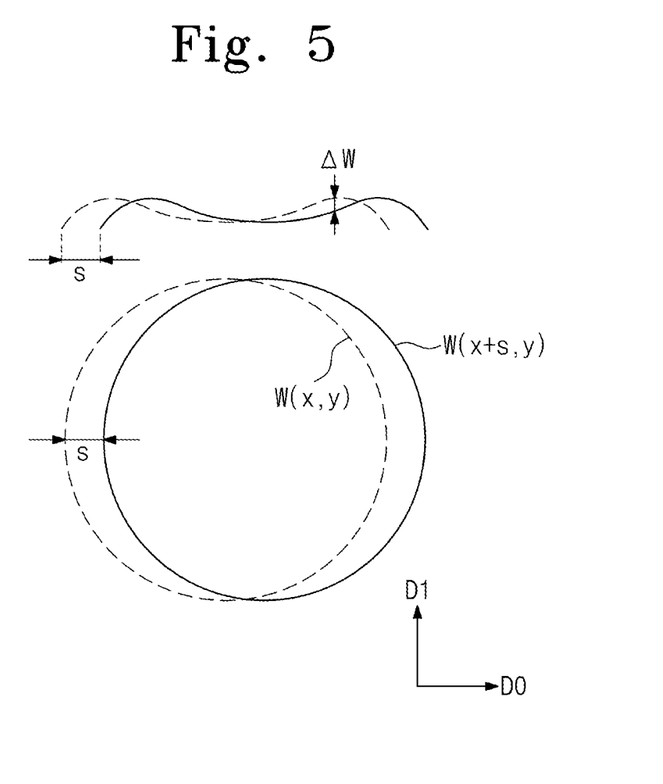
FIG. 5 is a view for explaining a method of obtaining slope information of the measuring apparatus illustrated in FIG. 4.

FIG. 5 is a drawing for describing a operating method of of the measuring apparatus illustrated in FIG. 4. In exemplary embodiments, an obtaining method for the slope information will be described with reference to FIG. 5. For ease of description, the measurement wavefront W is assumed to be sheared along a reference direction D0 or an x-axis. However, the scope of this invention is not limited hereto.

Referring to FIGS. 4 and 5, the measuring apparatus 110 may detect the measurement wavefront W from the target 101. In exemplary embodiments, the wavefront W may be detected on the basis of a light reflected by the target 101. The measuring apparatus 110 may perform shearing of the measurement wavefront W along the reference direction D0 by a predetermined value s. At this time, the measuring apparatus 110 may obtain the slope information about the measurement wavefront W on the basis of an interference pattern generated by the measurement wavefront W and the sheared wavefront W0. For example, the slope information about the measurement wavefront W may be expressed as Equation (1).

$$\frac{\partial W(x, y)}{\partial x} = \frac{\Delta W(x, y)}{s} = \frac{W(x, y) - W(z - s, y)}{s} \qquad (1)$$

where, W denotes a size of the wavefront in (x, y) coordinate system, s denotes a shearing value.

The measuring apparatus 110 may obtain the slope information about the measurement wavefront like Equation (1). For example, the measuring apparatus 110 may obtain the slope information of the measurement wavefront sheared along the first direction D1 which is rotated a first rotation angle $\alpha 1$ from the reference direction D0. The measuring apparatus 110 may derive the actual wavefront of the target 101 on the basis of the slope information of the obtained wavefront on the basis of the above-described method.

Figure 6:
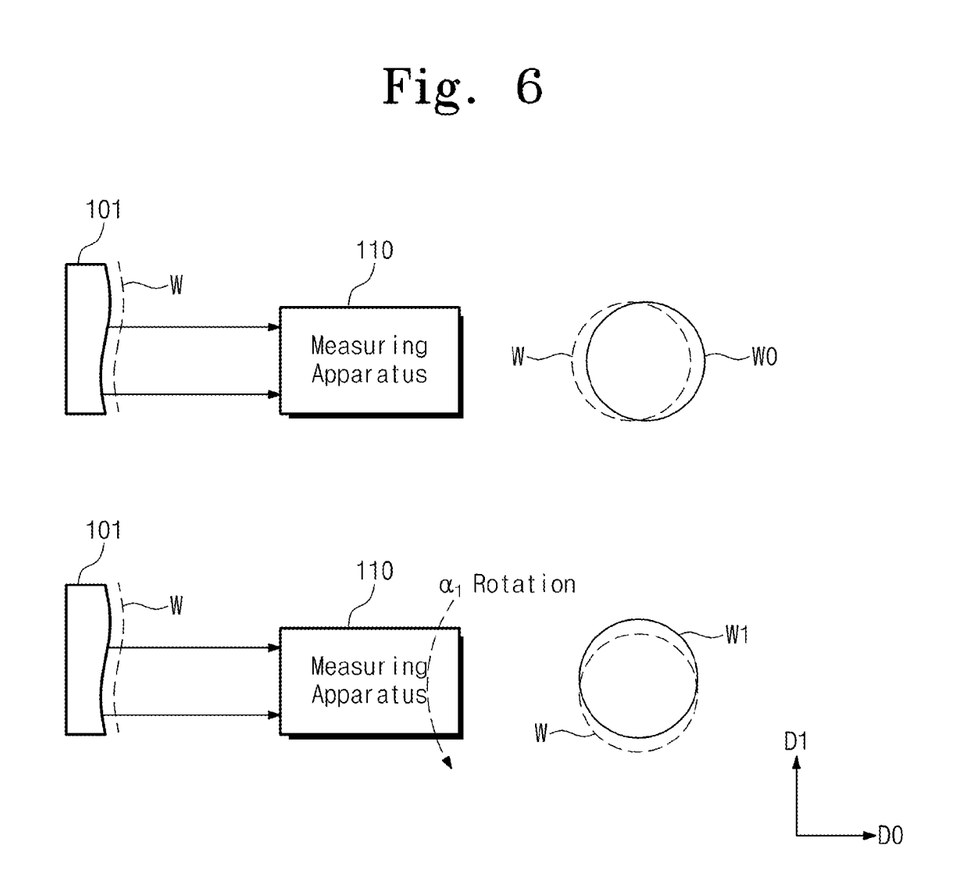
FIG. 6 is a view for explaining an operation of the measuring apparatus illustrated in FIG. 4.

FIG. 6 is a drawing for describing an operation of the measuring apparatus illustrated in FIG. 4. For ease of description, the measuring apparatus 110 is assumed to be rotated the first rotation angle $\alpha 1$. However, the scope of the present invention is not limited hereto, and the target 101 is rotated or the target 101 and the measuring apparatus 110 may be rotated together. Alternatively, the shearing unit 111 inside the measuring apparatus 110 may be rotated. Alternatively, a dove prism (not shown) included in the shearing unit 111 may be rotated. In addition, the measuring apparatus 110 may rotate first to third rotation angles $\alpha 1$ to $\alpha 3$, or a plurality of rotation angles. For example, the measuring apparatus 110 may rotate on an axis of a light reflected by the target 101.

Referring FIG. 6, the measuring apparatus 110 may detect or receive the measurement wavefront W from the target 101. The measuring apparatus 110 may perform shearing of the received wavefront W by a predetermined value s in the zeroth direction D0. The measuring apparatus 110 may detect the slope information of the wavefront of the target 101 on the basis of the measurement wavefront W and the sheared wavefront W0.

The measuring apparatus 110 may be rotated a first angle $\alpha 1$. The rotated measuring apparatus 110 may perform shearing of the measurement wavefront information W. At this time, a sheared direction of the rotated measuring apparatus 110 has an angle difference by the first rotation angle $\alpha 1$ from a sheared direction of the measuring apparatus 110 which is not rotated.

In exemplary embodiments, the measuring apparatus 110 may rotate the second and third angles $\alpha 2$ and $\alpha 3$. The measuring apparatus 110 rotated the second and third angles $\alpha 2$ and $\alpha 3$ may perform shearing of the received light. Similarly, a sheared direction of the measuring apparatus 110 rotated the second angle $\alpha 2$ has an angle difference of the second rotation angle $\alpha 2$ from the sheared direction of the measuring apparatus 110 which is not rotated. The sheared direction of the measuring apparatus 110 rotated the third angle α3 has an angle difference of the third rotation angle α3 from the sheared direction (in other words, the reference direction D0) of the measuring apparatus 110 which is not rotated.

According to the above-described exemplary embodiment of this invention, the measuring apparatus 110 may rotate the first to third angles α1 to α3 to obtain the slope information about each sheared wavefront. In other words, the measuring apparatus 110 may measure reference slope information and first to third slop information of each of the wavefronts sheared in the first to third directions.

In exemplary embodiments, the measuring apparatus 110 may integrate the measured slope information to detect the wavefront of the target 101. In other words, the measuring apparatus 110 may detect the wavefront of the target 101 by integrating, in the reference direction and the first to third directions, the slope information about the wavefronts sheared in the reference direction and the first to third directions.

Figure 7:
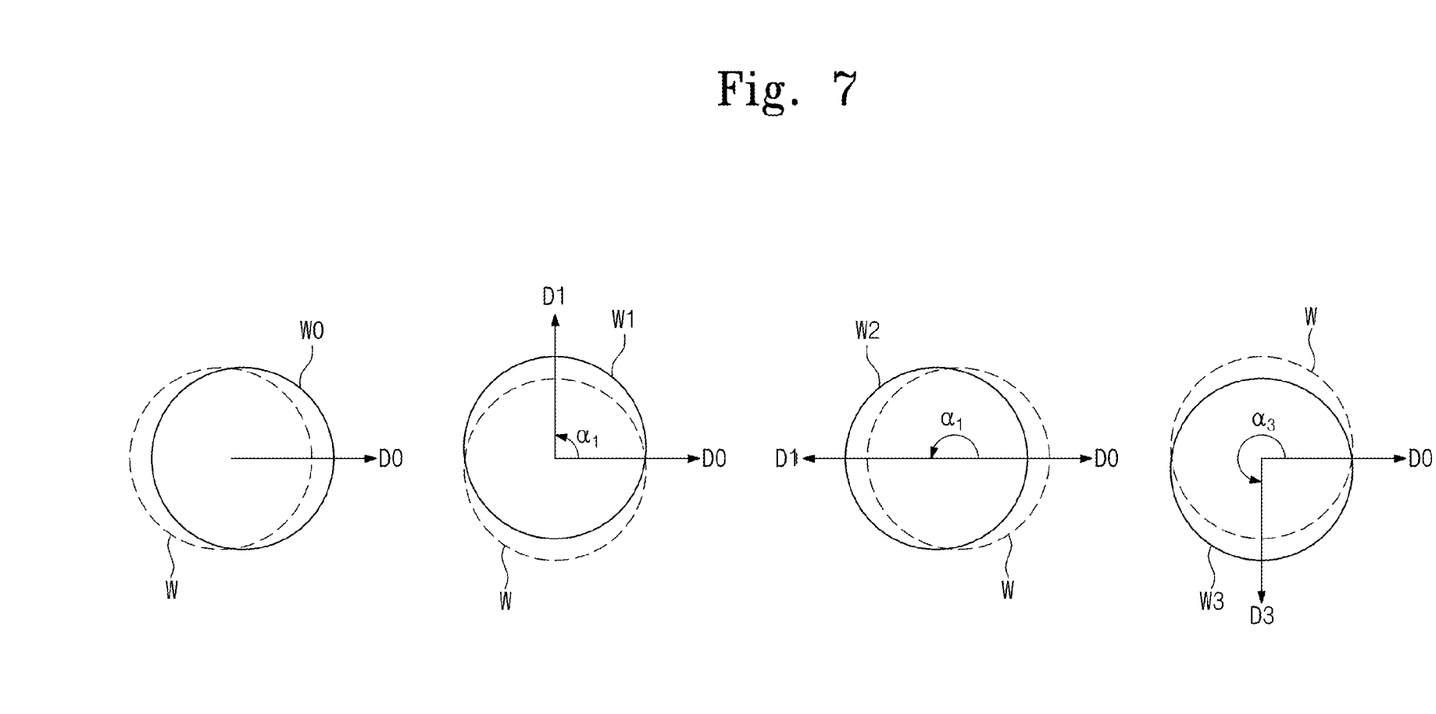
FIG. 7 illustrates exemplary sheared wavefronts.

FIG. 7 is drawing illustrated exemplary sheared wavefronts. Referring to FIGS. 6 and 7, the measuring apparatus 110 may perform shearing of a wavefront along the first direction D1. The measuring apparatus 110 may perform shearing of the wavefront along the second direction D2. For example, it is assumed that the reference direction D0 is an x-axis corresponding to a plane of the wavefront, a value, that the slope information of the sheared wavefront along the reference direction D0 is integrated, may be the same as Equation (2). In addition, a value, that a slope of the wavefront measured from the sheared wavefront along the first direction D1 is integrated, may be expressed as Equation (3).

$$W(r, \theta) = \sum_{l,k} R_l^k(r)[c_{lk}\cos(k\theta) + d_{lk}\sin(k\theta)] \quad (2)$$

$$W(r, \theta - \alpha) = \sum_{l,k} R_l^k(r)[c'_{lk}\cos(k\theta) + d'_{lk}\sin(k\theta)] \quad (3)$$

where, W denotes a measurement wavefront, r denotes a distance from the center, θ denotes an angle from an x-axis, $R_l^k$ denotes a radial component of a Zernike function, l and k denote orders of the Zernike function, $c_{lk}$, $d_{lk}$, $c_{lk}'$, and $d_{lk}'$ denote coefficients of the Zernike function, and α denotes an angle difference between the reference direction D0 and the first directions D1. For example, for concise expression of an equation, Equations (1) and (2) are represented on the basis of cylindrical coordinates.

Here, $c_{lk}$, $d_{lk}$, $c_{lk}'$, and $d_{lk}'$ have relationship as Equation (4).

$$\begin{bmatrix} c'_{lk} \\ d'_{lk} \end{bmatrix} = \begin{bmatrix} \cos\alpha & -\sin\alpha \\ \sin\alpha & \cos\alpha \end{bmatrix} \begin{bmatrix} c_{lk} \\ d_{lk} \end{bmatrix} = A \begin{bmatrix} c_{lk} \\ d_{lk} \end{bmatrix} \text{ for } k = 1, \text{ and} \quad (4)$$

$$\begin{bmatrix} c'_{lk} \\ d'_{lk} \end{bmatrix} = \begin{bmatrix} \cos(k\alpha) & -\sin(k\alpha) \\ \sin(k\alpha) & \cos(k\alpha) \end{bmatrix} \begin{bmatrix} c_{lk} \\ d_{lk} \end{bmatrix} = A^k \begin{bmatrix} c_{lk} \\ d_{lk} \end{bmatrix} \text{ for arbitrary } k$$

where A is a counterclockwise matrix.

Rearranging Equations (3) and (4), the measured wavefront of the target 101 derived from the wavefront sheared along the first direction D1 may be expressed as Equation (5).

$$W(r, \theta - \alpha) = \sum_{l,k} R_l^k(r)[c_{lk}\cos(k\theta - k\alpha) + d_{lk}\sin(k\theta - k\alpha)] = \quad (5)$$

$$\sum_{l,k} R_l^k(r)[c_{lk}\cos(k\theta) + d_{lk}\sin(k\theta)]\cos(k\alpha) +$$

$$\sum_{l,k} R_l^k(r)[-d_{lk}\cos(k\theta) + c_{lk}\sin(k\theta)]\sin(k\alpha) =$$

$$\sum_k [W^k(r, \theta)\cos(k\alpha) + W^k(r, \theta - 90°)\sin(k\alpha)] =$$

$$\sum_k [W^k(r, \theta)\cos(k\alpha) + \hat{W}^k(r, \theta)\sin(k\alpha)]$$

where, a newly defined variable $\hat{W}^k$ denotes a conjugate wavefront of the wavefront W. $W^k$ denotes a wavefront component at a k-th order.

As known in Equation (4), the wavefront rotated the first rotation angle α is associated with the wavefront component $W^k$ and the conjugate wavefront $\hat{W}^k$.

In exemplary embodiments, when the reference direction D0 and the first direction D1 have an angle difference of 90°, the coefficients of $c_{lk}'$, and $d_{lk}'$ are expressed as Equation (6).

$$\begin{bmatrix} c'_{lk} \\ d'_{lk} \end{bmatrix} = \begin{bmatrix} \cos 90° & -\sin 90° \\ \sin 90° & \cos 90° \end{bmatrix} \begin{bmatrix} c_{lk} \\ d_{lk} \end{bmatrix} = \begin{bmatrix} 0 & -1 \\ 1 & 0 \end{bmatrix} \begin{bmatrix} c_{lk} \\ d_{lk} \end{bmatrix} = \begin{bmatrix} -d_{lk} \\ c_{lk} \end{bmatrix} \quad (6)$$

Referring Equation (6), the coefficients $c_{lk}'$, and $d_{lk}'$ corresponding to the first direction D1 may have a relationship as expressed in Equation (6) with coefficients of the wavefront corresponding to the reference direction D0. The wavefronts sheared along the second and third directions D2 and D3 may also be expressed as Equations (5) and (6).

In exemplary embodiments, the first to third directions D1 to D3 respectively have angle differences of 90°, 180°, and 270° with the reference direction D0. At this time, the measuring apparatus 110 may detect the actual wavefront of the target 101 by integrating the slope information about the wavefront along the reference direction D0 and the first direction D1. However, due to external causes, the measuring apparatus 110 or the target 101 may not rotate precisely 90°, 180°, and 270°. That is, the rotation angles may include rotation errors. Due to the rotation errors, the measurement wavefront measured through the measuring apparatus 110 and the actual wavefront of the target 101 may be different from each other.

According to an embodiment of this invention, the actual wavefront of the target 101 may calculate the rotation angle including the rotation error to compensate the rotation error. For example, the wavefront of the target 101 may be modeled as Equation (7).

$$W^k(r, \theta) = \sum_l^L R_l^k(r)[c_{lk}\cos(k\theta) + d_{lk}\sin(k\theta)] = \sum_l^L \beta_l^k Z_l^k(x, y), \quad (7)$$

$$Z_l^k(x, y) \equiv R_l^k(r) \begin{Bmatrix} \cos \\ \sin \end{Bmatrix} (k\theta)$$

Descriptions of variables of Equation (7) described in relation to Equations (1) to (6) are omitted at this time. Referring to Equation (7), the measurement wavefront is represented as multiplication of β and Z. At this time, Z(x, y) is a function including r and θ as expressed in Equation (6). That is, the actual wavefront of the target 101 may be detected by deriving β and Z. An calculating algorithm for β and Z will be described in detail with reference to Equation (7) and other Equations thereafter.

Figure 8:
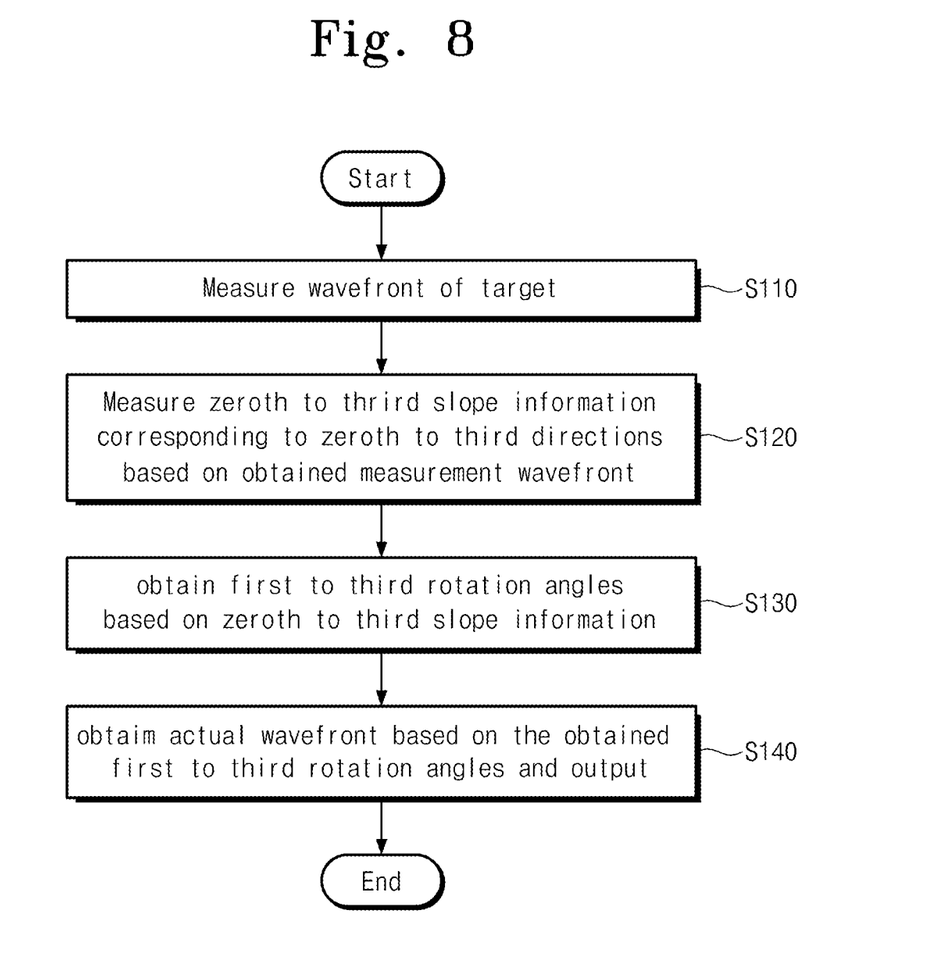
FIG. 8 is a flowchart illustrating an operating method of the measurement apparatus illustrated in FIG. 6.

FIG. 8 is a flowchart illustrating an operating method of the measuring apparatus illustrated in FIG. 6. Referring to FIGS. 6 to 8, in step S110, the measuring apparatus 100 may obtain the measurement wavefront of the target 101.

In step S120, the measuring apparatus 110 may measure reference slope information and first to third slope information respectively corresponding to the reference direction D0 and the first to third directions D1 to D3 from the obtained measurement wavefront. For example, the measuring apparatus 110 may perform shearing of the measurement wavefront along the reference direction D0 by a predetermined value. The measuring apparatus 110 may measure the reference slope information on the basis of the wavefront sheared along the reference direction D0. The measuring apparatus 110 may rotate the first rotation angle α1, and then, perform shearing of the measurement wavefront along the first direction D1 by a predetermined value. The measuring apparatus 110 may measure the first slope information on the basis of the wavefront sheared along the first direction D1. The measuring apparatus 110 may rotate the first rotation angle α2, and then, perform shearing of the measurement wavefront along the second direction D2 by a predetermined value. The measuring apparatus 110 may measure the second slope information on the basis of the wavefront sheared along the second direction D2. The measuring apparatus 110 may rotate the third rotation angle α3, and then, perform shearing the measurement wavefront along the third direction D3 by a predetermined value. The measuring apparatus 110 may measure the third slope information on the basis of the wavefront sheared along the third direction D3.

In exemplar embodiments, the shearing unit 111 included in the measuring apparatus 110, or the dove prism (not shown) included in the shearing unit 111, or the target 101 may be rotated.

In exemplary embodiments, the reference slope information and the first to third slope information may be expressed as Equation (8).

$$\left.\frac{\partial \hat{W}_j^k}{\partial x}\right|_{j=0} = \frac{\partial \hat{W}^k(r,\theta)}{\partial x} = \sum_l \beta_l^k \frac{\partial Z_l^k(x,y)}{\partial x}\cos(k\alpha_0) + \sum_l \tilde{\beta}_l^k \frac{\partial Z_l^k(x,y)}{\partial x}\sin(k\alpha_0)$$

$$\left.\frac{\partial \hat{W}_j^k}{\partial x}\right|_{j=1} = \frac{\partial \hat{W}^k(r,\theta-\alpha_1)}{\partial x} = \sum_l \beta_l^k \frac{\partial Z_l^k(x,y)}{\partial x}\cos(k\alpha_1) + \sum_l \tilde{\beta}_l^k \frac{\partial Z_l^k(x,y)}{\partial x}\sin(k\alpha_1)$$

$$\left.\frac{\partial \hat{W}_j^k}{\partial x}\right|_{j=2} = \frac{\partial \hat{W}^k(r,\theta-\alpha_2)}{\partial x} = \sum_l \beta_l^k \frac{\partial Z_l^k(x,y)}{\partial x}\cos(k\alpha_2) + \sum_l \tilde{\beta}_l^k \frac{\partial Z_l^k(x,y)}{\partial x}\sin(k\alpha_2)$$

-continued $$\left.\frac{\partial \hat{W}_j^k}{\partial x}\right|_{j=3} = \frac{\partial \hat{W}^k(r,\theta-\alpha_3)}{\partial x} = \sum_l^L \beta_l^k \frac{\partial Z_l^k(x,y)}{\partial x}\cos(k\alpha_3) + \sum_l^L \tilde{\beta}_l^k \frac{\partial Z_l^k(x,y)}{\partial x}\sin(k\alpha_3)$$

where, j denotes the number of rotations, $\hat{W}$ and $\tilde{\beta}$ denote an actually measured wavefront and factor information. Since rest of the variables of Equation (8) is described in relation to Equations 1 to 7, description about them is omitted.

Referring to Equation (8), the first to third rotation angles α1 to α3 may include rotation errors. At this time, the slope information of the measured wavefront and the slope information of an actual wavefront may be different from each other.

In step S130, the measuring apparatus 110 may detect the first to third rotation angles on the basis of the measured reference slope information and the first to third slope information. For example, the detected reference slope information and first to third slope information may include errors. The errors may indicate errors generated by rotation errors generated when the first to third rotation angles are deviated from 90°, 180°, and 270°, respectively. In order to compensate for these errors, a least square optimization may be employed. A slope information difference for using the least square optimization may be expressed as Equation (9).

$$\hat{D}_j^k = \frac{\partial \hat{W}_j^k(r,\theta)}{\partial x} - \frac{\partial \hat{W}_0^k(r,\theta)}{\partial x} = \sum_l^K \beta_l^k \frac{\partial Z_l^k(x,y)}{\partial x}[\cos(k\alpha_j)-1] + \sum_l^K \tilde{\beta}_l^k \frac{\partial Z_l^k(x,y)}{\partial x}\sin(k\alpha_j) \qquad (9)$$

where, $\hat{D}$ denotes a difference between the measured slope information corresponding to the reference direction D0 and the measured slope information corresponding to a j-th direction. Since rest of the variables of Equation (9) is described in relation to Equations 1 to 8, description about them is omitted.

An optimization function with reference to the slope information difference written in Equation (9) may be expressed as Equation (10).

$$F_l^k = \sum_{j=0}^{N-1}\{D_{lj}^k - \hat{D}_{lj}^k\}^2 = \sum_{j=0}^{N-1}\left\{\beta_l^k \frac{\partial Z_l^k(x,y)}{\partial x}[\cos(k\alpha_j)-1] + \tilde{\beta}_l^k \frac{\partial Z_l^k(x,y)}{\partial x}\sin(k\alpha_j) - \hat{D}_{lj}^k\right\}^2 \qquad (10)$$

$$F_j^k = \sum_l^L \{D_{lj}^k - \hat{D}_{lj}^k\}^2 = \sum_l^L \left\{\beta_l^k \frac{\partial Z_l^k(x,y)}{\partial x}[\cos(k\alpha_j)-1] + \tilde{\beta}_l^k \frac{\partial Z_l^k(x,y)}{\partial x}\sin(k\alpha_j) - \hat{D}_{lj}^k\right\}^2$$

where, $F_l^k$ denotes a function indicating a partial sum of errors due to the rotation angles included in Zernike radial coefficients and $F_j^k$ denotes a function indicating a partial sum of error due to a j-th slope. Since rest of the variables of Equation (10) is described in relation to Equations 1 to 9, description about them is omitted.

The measuring apparatus 110 may calculate β and the first to third rotation angles α1, α2, and α3 allowing the optimization functions $F_i^k$ and $F_j^k$ in Equation (10) to be minimized. For example, a condition allowing the optimization functions in Equation (10) to be minimized may be expressed as Equation (11).

$$\frac{\partial F_l^k}{\partial \beta_l^k} = 0, \frac{\partial F_l^k}{\partial \tilde{\beta}_l^k} = 0, \frac{\partial F_j^k}{\partial \cos(k\alpha_j)} = 0, \frac{\partial F_j^k}{\partial \sin(k\alpha_j)} = 0 \quad (11)$$

where, since the variables and factors of Equation (11) are described in relation to Equations 1 to 10, description about them is omitted.

Referring to Equation (11), variables that allow the optimization functions to be minimized may be obtained by performing partial differentiation on the optimization functions of Equation (10). In other words, the first to third rotation angles α1, α2, and α3 including the rotation errors may be obtained by solving Equation (11).

The solution of Equation (10) may be expressed as Equations (12) and (13).

$$M \begin{bmatrix} \beta_l^k \\ \tilde{\beta}_l^k \end{bmatrix} = N, \quad (12)$$

$$M = \begin{bmatrix} \sum_{j=0}^{N-1} [\cos(k\alpha_j) - 1]^2 \frac{\partial Z_l^k(x,y)}{\partial x} & \sum_{j=0}^{N-1} \sin(k\alpha_j)[\cos(k\alpha_j) - 1] \frac{\partial Z_l^k(x,y)}{\partial x} \\ \sum_{j=0}^{N-1} \sin(k\alpha_j)[\cos(k\alpha_j) - 1] \frac{\partial Z_l^k(x,y)}{\partial x} & \sum_{j=0}^{N-1} \sin^2(k\alpha_j) \frac{\partial Z_l^k(x,y)}{\partial x} \end{bmatrix},$$

$$M = \begin{bmatrix} \sum_{j=0}^{N-1} \hat{D}_{lj}^k \sin(k\alpha_j) \\ \sum_{j=0}^{N-1} \hat{D}_{lj}^k \sin(k\alpha_j) \end{bmatrix}$$

$$\begin{bmatrix} \beta_l^k \\ \tilde{\beta}_l^k \end{bmatrix} = M^{-1} N$$

$$P \begin{bmatrix} \cos(k\alpha_j) \\ \sin(k\alpha_j) \end{bmatrix} = Q, \quad (13)$$

$$P = \begin{bmatrix} \sum_l^L \left[\beta_l^k \frac{\partial Z_l^k(x,y)}{\partial x}\right]^2 & \sum_l^L \beta_l^k \tilde{\beta}_l^k \left[\frac{\partial Z_l^k(x,y)}{\partial x}\right]^2 \\ \sum_l^L \beta_l^k \tilde{\beta}_l^k \left[\frac{\partial Z_l^k(x,y)}{\partial x}\right]^2 & \sum_l^L \left[\tilde{\beta}_l^k \frac{\partial Z_l^k(x,y)}{\partial x}\right]^2 \end{bmatrix}$$

$$Q = \begin{bmatrix} \sum_l^L \left\{ \hat{D}_{lj}^k \frac{\partial Z_l^k(x,y)}{\partial x} + \left[\beta_l^k \frac{\partial Z_l^k(x,y)}{\partial x}\right]^2 \right\} \\ \sum_l^L \left\{ \hat{D}_{lj}^k \tilde{\beta}_l^k \frac{\partial Z_l^k(x,y)}{\partial x} + \beta_l^k \tilde{\beta}_l^k \left[\frac{\partial Z_l^k(x,y)}{\partial x}\right]^2 \right\} \end{bmatrix}$$

$$\begin{bmatrix} \cos(k\alpha_j) \\ \sin(k\alpha_j) \end{bmatrix} = P^{-1} Q \quad (13)$$

where, the variables and factors of Equations (12) and (13) are described in relation to Equations 1 to 11, description about them is omitted.

β and the first to third rotation angles allowing errors between the measured wavefront and the actual wavefront to be minimized may be obtained from the Equations (12) and (13). For example, Equations (12) and (13) are nonlinear equations. The measuring apparatus 110 may obtain approximate values of the solutions (for example, β and the first to third rotation angles) of Equations (12) and (13) by using a repetitive method. For example, assuming an ideal case where any error does not exist in the measuring apparatus 110, the first to third rotation angles may be respectively 90°, 180°, and 270°. β is derived from Equation (12) by assuming that the first to third rotation angles α1, α2, and α3 have 90°, 180°, and 270° as respective initial values. The first to third rotation angles α1, α2, and α3 may be derived by applying the derived β to Equation (13). The derived rotation angles are again applied to Equation (12). The above-described procedure is repetitively performed and when change amounts of the rotation angles are a predetermined value or smaller, the measuring apparatus 110 may determine that the errors are corrected. According to the above-described method, the measuring apparatus 110 may detect error-corrected first to third rotation angles α1, α2, and α3.

In step S140, the measuring apparatus 110 may obtain a wavefront of the target 101 on the basis of the detected first to third rotation angles. For example, the measuring apparatus 110 may derive the first to third rotation angles α1, α2, and α3 on the basis of the algorithm described in reference with operation S130. The measuring apparatus 110 may obtain an error-corrected wavefront of the target 101 by applying the derived coefficient β of the Zernike function and the derived first to third rotation angles α1, α2, and α3 to Equations (5) and (7). For example, the error indicates a difference between the actual wavefront and the measured wavefront, which may occur due to the rotation errors.

For example, a slope difference D in Equation (9) may be used for preventing a discriminant of a matrix M of Equation (12) from being 0.

For example, the measuring apparatus 110 may transfer the obtained actual wavefront information about the target 101 to an external device (for example, a display apparatus, a computing system, etc.). The external device receiving the actual wavefront information may display the actual wavefront or perform another operation on the basis of the actual wavefront information.

According to an embodiment of the present invention, the measuring apparatus 110 may perform shearing of the measurement wavefront of the target 101 along each of the reference direction D0 and the first to third directions D1, D2, and D3, and detect the reference slope information and the first to third slope information on the basis thereof. At this time, the rotation angle of the measuring apparatus 110 may be compensated by detecting the first to third rotation angles which are differences in angle between each of the first to third directions and the reference direction, and applying the detected rotation angles to the detected reference slop information and the first to third slope information. Accordingly, a measuring apparatus operating method is provided which has enhanced reliability.

Figure 9:
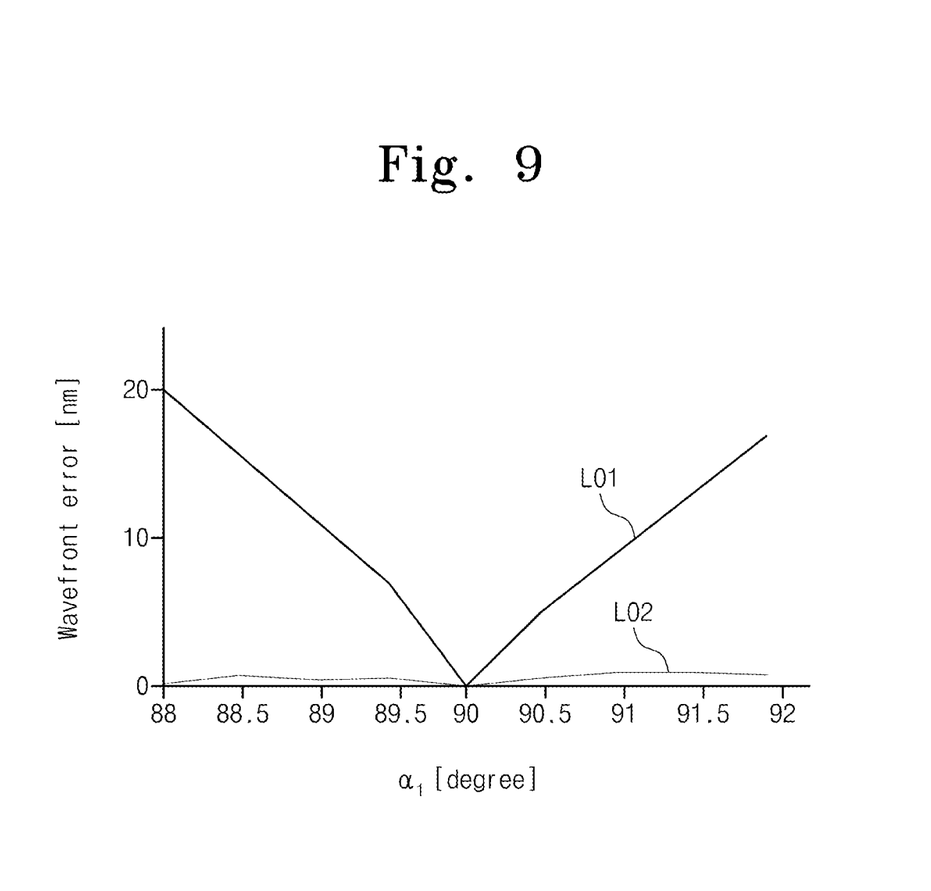
FIG. 9 is a graph showing an effect of a measuring apparatus according to an embodiment of the present invention.

FIG. 9 is a graph showing an effect of a measuring apparatus according to an embodiment of the present invention. For example, an x-axis in FIG. 9 denotes the first rotation angle α1 and a y-axis denotes a wavefront error. Referring to FIG. 9, when the first rotation angle α1 is deviated from 90° like a first line LO1, a typical shear measuring apparatus may have an error of 0 to 20 nm. Thus, when the first angle α1 is 88°, a wavefront measured by the typical shear measuring apparatus has an error of 20 nm with an actual wavefront.

However, the measuring apparatus 110 according to an embodiment of this invention may have 0 to 0.5 nm error, when the first rotation angle α1 is deviated from 90° like a second line LO2. That is, compared to the typical shear measuring apparatus, the measuring apparatus 110 according to an embodiment of this invention may compensate for an error between the measured wavefront and the actual wavefront, which is generated by rotation errors. Accordingly, a measuring apparatus having enhanced reliability and an operating method thereof are provided. In an embodiment of the present invention, the measuring apparatus is described based on a lateral shearing interferometer, but the scope of the present invention is not limited hereto. The measuring apparatus according to the present invention may be provided on the basis of a first derivative measuring apparatus such as a deflectometry, a lateral shearing interferometer, or a Shack-Hartmann sensor, etc.

According to the above-described embodiments of this invention, a first derivative measuring apparatus may perform shearing of a wavefront of a target along a plurality of directions. At this time, the plurality of directions have different directional nature and different rotation angles. The first derivative measuring apparatus may measure a plurality of pieces of slope information on the basis of wavefronts sheared along the plurality of directions, respectively. The first derivative measuring apparatus may calculate rotation angles respectively corresponding to the plurality of directions on the basis of the plurality of measured pieces of slope information. The first derivative measuring apparatus may obtain a wavefront of which an error (for example, a wavefront error generated by the rotation errors) is corrected on the basis of the calculated rotation angles. Accordingly, since the error due to the rotation errors is corrected, the first derivative measuring apparatus having enhanced reliability is provided.

According to embodiments of the present invention, a first derivative measuring apparatus can detect a wavefront of a free-form surface. Here, an error between a measured wavefront and an actual wavefront can be reduced by operating a precise value of a rotation angle.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An operating method of generating an error-corrected wavefront of a target, the operating method comprising:
receiving, via a measurement apparatus, measurement wavefronts of a surface of the target, the measurement wavefronts including a reference measurement wavefront and first to third measurement wavefronts measured when the measurement apparatus is rotated at different rotational angles;
determining, based on the measurement wavefronts, reference slope information and first to third slope information corresponding to a reference direction and first to third directions, respectively, the reference direction being a direction along a horizontal axis corresponding to a plane of the reference measurement wavefront and the first to third directions being directions of lateral shearing respective ones of the first to third measurement wavefronts;
compensating, based on the determined reference slope information and the first to third slope information, for differences between each of the first to third directions and the reference direction to obtain first to third rotation angles, respectively such that the first to third rotation angles represent a difference between a respective one of the first to third directions and the reference direction; and
outputting the error-corrected wavefront, based on the first to third rotation angles.

2. The operating method of claim 1, wherein the determining the reference slope information and the first to third slope information comprises:
shearing the reference measurement wavefront along the reference direction by an amount and measuring the reference slope information based on the reference measurement wavefront sheared along the reference direction;
shearing the first measurement wavefront along the first direction by an amount and measuring the first slope information based on the first measurement wavefront sheared along the first direction;
shearing the second measurement wavefront along the second direction by an amount and measuring the second slope information based on the second measurement wavefront sheared along the second direction; and
shearing the third measurement wavefront along the third direction by an amount and measuring the third slope information based on the third measurement wavefront sheared along the third direction.

3. The operating method of claim 1, wherein the compensating for the differences between each of the first to third directions and the reference direction comprises:
compensating for the differences between each of the first to third directions and the reference direction to obtain the first to third rotation angles, respectively based on a least square optimization.

4. The operating method of claim 3, wherein the compensating for the differences between each of the first to third directions and the reference direction to obtain the first to third rotation angles, respectively based on the least square optimization comprises:
performing a repetitive operation based on a repetitive scheme allowing variations of the first to third rotation angles to be smaller than a threshold value.

5. The operating method of claim 1, wherein the first to third rotation angles each include rotation errors, the rotation errors indicating differences that the first to third rotation angles deviate from 90°, 180°, and 270°, respectively such that as the rotation errors become smaller, a difference between the wavefront of the target and the error corrected wavefront is reduced.

6. The operating method of claim 1, wherein the measuring apparatus is any one of a lateral shearing interferometer, a Shack-Hartmann sensor, and a deflectometry.

7. An operating method generating an error-corrected wavefront of a target, comprising:
receiving measurement wavefronts of a surface of a target using a measuring apparatus, the measurement wavefronts including a reference measurement wavefront and first to third measurement wavefronts measured when the measurement apparatus is rotated at different rotational angles;
shearing the measurement wavefronts along a reference direction and a plurality of directions to generate a plurality of sheared wavefronts, respectively, the reference direction being a direction along a horizontal axis corresponding to a plane of the reference measurement wavefront and the plurality of directions being directions of lateral shearing respective ones of the first to third measurement wavefronts;
determining a plurality of slope information based on the plurality of sheared wavefronts;
compensating for differences between each of the plurality of directions and the reference direction to obtain a plurality of error-corrected rotation angles, respectively, based on the plurality of slope information such that the plurality of error-corrected rotation angles represent a difference between a respective one of the plurality of directions and the reference direction; and
correcting an error in the measurement wavefronts of the surface of the target based on the plurality of error-corrected rotation angles to generate the error-corrected wavefront.

8. The operating method of claim 7, wherein the correcting includes reducing an error between the measurement wavefronts and actual wavefronts of the surface of the target based on the plurality of error-corrected rotation angles.

9. The operating method of claim 7, further comprising: outputting an the error-corrected wavefront after correcting the error in the measurement wavefronts of the surface of the target, wherein the correcting corrects the error such that a reliability of the measuring apparatus increases.

* * * * *